Patented June 10, 1930

1,763,556

UNITED STATES PATENT OFFICE

RICHARD HERZ, OF FRANKFORT-ON-THE-MAIN, ERNST RUNNE, OF HOCHST-ON-THE-MAIN, AND EDUARD ALBRECHT, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

TRI HALOGEN BENZENE SULPHOCHLORIDE AND PROCESS FOR PREPARING THE SAME

No Drawing. Application filed March 15, 1928, Serial No. 262,031, and in Germany March 18, 1927.

We have found that by treating trihalogen benzene derivatives particularly those corresponding to the general formula

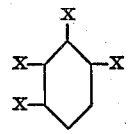

in which formula the X's mean halogen and Y means hydrogen, or an alkyl group, with chlorosulfonic acid, uniform sulphochlorides are formed. It is a surprising fact that this reaction produces uniform sulphochlorides as according to the behaviour of toluene the formation of several isomeric sulphochlorides was to be expected. These sulphochlorides are reduced to the corresponding mercaptane compounds and yield by condensing the latter with monochloroacetic acid trihalogen arylthioglycolic acids of the general formula:

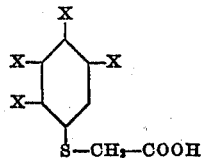

wherein the X's and Y have the aforesaid signification.

Our present process is more economical and yields the desired products in a purer state than the hitherto generally applied process starting from the corresponding animo-compounds and subjecting them to the so called Leukard's reaction.

The trihalogenarylthioglycolic acids, obtained according to our process, are new compounds and represent valuable intermediates for the production of dyestuffs of the thioindigo series.

In order to further illustrate our invention, the following examples are given, the parts being by weight and all temperatures in centigrade degrees. We wish it however to be understood that we are not limited to the particular products nor reaction conditions mentioned therein.

Example 1

(a) Production of 1.2.3-trichlorobenzene-4-sulfochloride of the formula:

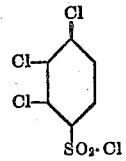

182 parts of 1.2.3-trichlorobenzene of the melting point 53–54° (cf. Beilstein, 4th edition, Vol. 5, page 203) are introduced at 20–30° into 750 parts of chlorosulfonic acid. The mixture is slowly heated to about 70° and kept at this temperature for about 2 hours while stirring. When cold the mass is poured on ice, the separated sulphochloride is filtered off and directly used for the further process. This new compound melts in a pure state at about 65–66°.

(b) Production of 1.2.3-trichlorobenzene-4-mercaptane of the formula:

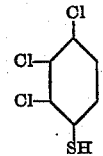

Into a suitable apparatus fitted with a stirrer, a condenser and a stem injector at about 50° a mixture of 400 parts of sulfuric acid of 95% and 100 parts of ice is introduced, then the quantity of the sulphochloride obtained according to (a) and 350 parts of zinc dust are slowly added, the vessel is closed, then the temperature is slowly increased to 100° and steam is injected during the whole process of reaction. The new 1.2.3-trichlorobenzene-4-mercaptane passes over.

(c) production of 1.2.3-trichloro-benzene-4-thioglycolic acid of the formula:

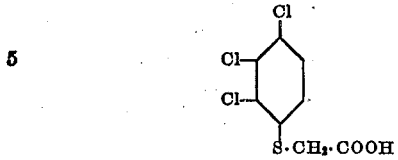

The mercaptane compound described sub (b) is dissolved at about 40° in 520 parts of a caustic soda solution of 33° Bé and 3000 parts of water and mixed with 100 parts of mono-chloro-acetic acid. Then the mass is stirred at about 50° for an hour. After cooling down the precipitated sodium salt of the formed 1.2.3-trichloro-benzene-4-thioglycolic acid is filtered off. By acidifying the free acid may be obtained therefrom as white needles of the melting point 149°.

*Example 2*

A thioglycolic acid isomeric to that described in Example 1 may be produced in the following manner: 182 parts of 182 parts of 1.2.4-trichloro-benzene of the melting point 17° described in Beilstein, edition 4, Vol. 5, page 204, is transposed in the same manner as described in Example 1 into the 1.2.4-trichlorobenzene-5-sulphochloride of the formula:

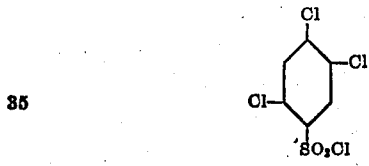

The sulphochloride thus obtained and 250 parts of zink dust are introduced in a vessel as described in Example 1 at about 50° into a mixture of 250 parts of sulfuric acid of 66° Bé. and 2000 parts of water. The temperature is gradually increased to 100° and kept as this temperature for about 5 hours while stirring. The 1.2.4-trichloro-benzene-5-mercaptane precipitated in the cold is filtered off. It is introduced at about 50° into 520 parts of caustic soda solution of 33° Bé. diluted with 3000 parts of water and mixed with 100 parts of monochloro-acetic acid. After about 1 hour the mass is cooled down. The difficultly soluble sodium salt of the formed 1.2.4-trichloro-benzene-5-thioglycolic acid separates and is purified by recrystallizing it from hot water. By acidifying the filtered solution the free acid is obtained corresponding to the formula

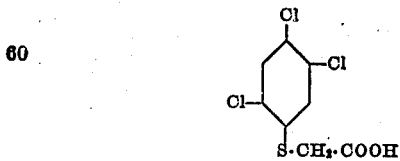

melting at about 113°.

*Example 3*

When starting from 196 parts of 2.3.4-trichloro-toluene of the melting point 41°, described in Beilstein, edition 4, Vol. 5, page 298, and working otherwise according to Example 1, the new 1-methyl-2.3.4-trichlorobenzene-5-thioglycolic acid is obtained. It corresponds probably to the formula:

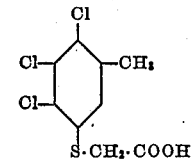

and melts at about 160–161°.

We claim:
1. As new compounds products corresponding probably to the general formula:

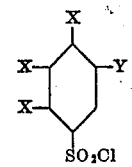

in which formula the X's mean chlorine and Y means hydrogen or an alkyl group, being crystalline powders, which can be saponified to the corresponding sulfonic acids and reduced to the corresponding mercaptan compounds.

2. As a new compound 1.2.3-trichlorobenzene-4-sulphochloride of the formula:

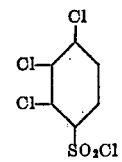

being a crystalline powder of the melting point 65–66°, which can be saponified to 1.2.3-trichloro-benzene-4-sulfonic acid and reduced to 1.2.3-trichloro-benzene-4-mercaptan.

3. The process which comprises treating a halogen benzene compound of the general formula:

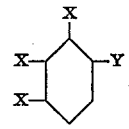

wherein the X's mean halogen and Y means hydrogen or an alkyl group with chloro sulfonic acid at a temperature below 100° C.

In testimony whereof, we affix our signatures.

RICHARD HERZ.
ERNST RUNNE.
EDUARD ALBRECHT.

Certificate of Correction

Patent No. 1,763,556. — Granted June 10, 1930, to

RICHARD HERZ ET AL.

It is hereby certified that error appears in the printed specification of the above-numbered patent requiring correction as follows: Page 1, lines 4 to 8, strike out the formula and insert instead

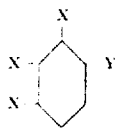

same page, lines 21 to 27, strike out the formula and insert instead

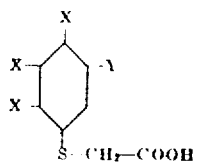

and lines 33 and 34, for the misspelled compound word "animo-compounds" read *amino-compounds;* and that the said Letters Patent should be read with these corrections therein that the same may conform to the record of the case in the Patent Office.

Signed and sealed this 19th day of August, A. D. 1930.

[SEAL.]

M. J. MOORE,
*Acting Commissioner of Patents.*